United States Patent [19]
Heller et al.

[11] 3,820,334
[45] June 28, 1974

[54] HEATING POWER PLANTS

[75] Inventors: Laszlo Heller; Laszlo Forgo; Gabor Tomcsanyi, all of Budapest, Hungary

[73] Assignee: Transelektro Magyar Villamossagi Kulkereskedelmi Vallalat, Budapest, Hungary

[22] Filed: July 28, 1972

[21] Appl. No.: 276,201

[30] Foreign Application Priority Data
Aug. 3, 1971   Hungary .......................... HE 593

[52] U.S. Cl. .................... 60/688, 60/692, 60/693
[51] Int. Cl. ................................... F01k 9/00
[58] Field of Search .................... 60/95 R; 165/110

[56] References Cited
UNITED STATES PATENTS

| | | | |
|---|---|---|---|
| 1,465,095 | 8/1923 | Richardson | 60/95 R |
| 2,793,502 | 5/1957 | Riehl | 60/95 R |
| 2,982,864 | 5/1961 | Furreboe | 60/95 R X |
| 3,150,267 | 9/1964 | Caldwell | 60/95 R X |
| 3,488,960 | 1/1970 | Kirkpatrick | 60/95 R |
| 3,557,554 | 1/1971 | Martinek et al. | 60/95 R |
| 3,635,042 | 1/1972 | Spangemacher | 60/95 R |
| 3,666,246 | 5/1972 | Cohen | 60/95 |

*Primary Examiner*—Edgar W. Geoghegan
*Assistant Examiner*—H. Burks
*Attorney, Agent, or Firm*—Blum, Moscovitz, Friedman & Kaplan

[57] ABSTRACT

Steam produced by a turbine in the course of generating electric power is released through conduit means into one or more surface condensers, where it is condensed. Heat exchange fluid contained in a closed system including a heat consumer outlet is continuously recycled under pressure through the one or more surface condensers wherein the fluid is warmed. When the heat exchange fluid is insufficiently cooled by passage through the heat consumer outlet, supplementary cooling means are provided to cool the heat exchange fluid prior to recirculation through the one or more surface condensers.

4 Claims, 7 Drawing Figures

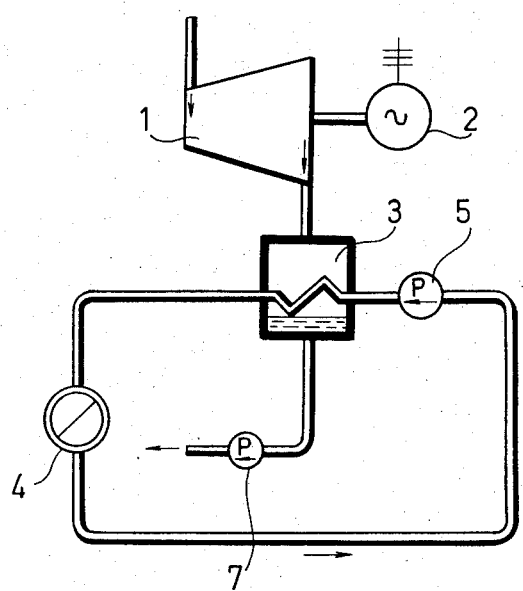
Fig.1 _PRIOR ART_
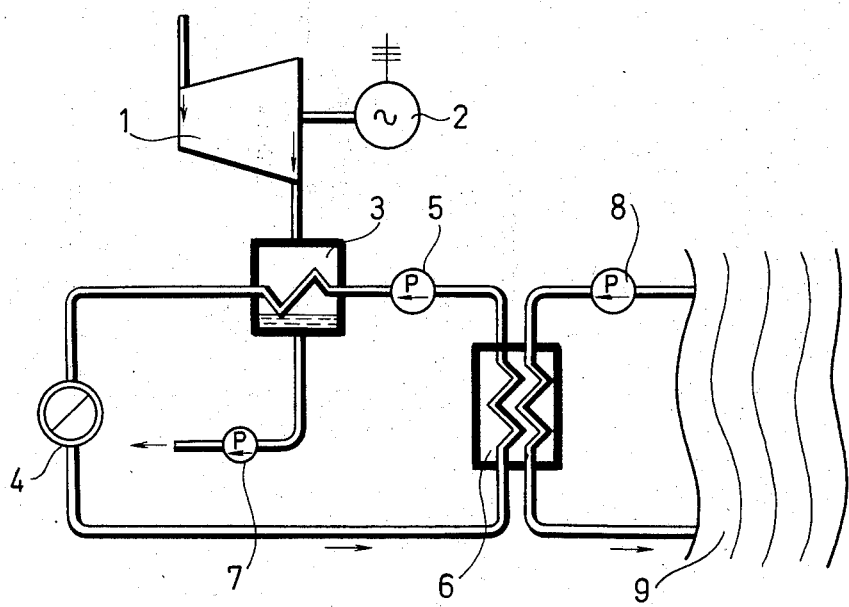
Fig.2

HEATING POWER PLANTS

BACKGROUND OF THE INVENTION

The present invention relates to power plants, and more particularly to turbine operated power plants of the type which serve as a heat source in addition to generating electric power.

Heretofore, in turbine operated power plants which generate electric energy and provide steam, as a heat source, the steam has been extracted from the turbine at one or more tapping points and has been released into surface condensers wherein it simultaneously condenses and warms circulating water which is thereafter conducted to heat consumers for distribution. When more than one surface condenser is employed the condensers are usually connected to each other in series to facilitate the disposal of condensate.

Such turbine operated power plants of the type described are hereinafter referred to as "heating power plants" and the water circulated through the surface condensers, and heated therein, which is conducted to the heat consumers is hereinafter referred to as "heating water" or "heat exchange fluid."

Previously, heating power plants have operated under full load or nearly full load conditions only during cold weather when there is a corresponding high demand for heat. Conventionally, heating power plants supply an amount of electric power which corresponds to the demand for heat. Therefore, when the demand for heat diminishes, in warm weather, there is a corresponding cutback in the electrical output of the plant.

Accordingly, the invention provides means for operating such heating power plants at their full capacity for generating electric energy independently of concomitant demands for heat and ambient temperatures.

SUMMARY OF THE INVENTION

Generally speaking, in accordance with the invention, novel means for circulating a heat exchange fluid through one or more surface condensers of a turbine operated heating power plant are provided. Additionally, supplementary cooling means for cooling the heat exchange fluid circulated through the surface condensers and carrying heat to the heat consumers are provided to render the electrical output of the heating power plant independent of heat output or the ambience of the plant.

Briefly, steam produced by a turbine in the course of generating electric power is released through conduit means into one or more surface condensers wherein it is condensed. The condensate may be routed from the surface condenser by conduit means to a disposal trap. A heat exchange fluid contained in a closed system including a heat consumer outlet is continuously recycled under pressure through the one or more surface condensers and in the course of being cycled therethrough warms. Heat from the condensing steam transmitted to the heat exchange fluid as it is cycled through the surface condensers must be substantially dissipated through the heat consumer outlets to maintain the efficiency of the system. Supplementary cooling means are provided to cool the heat exchange fluid in warm weather when there is little or no demand for heat from the heat consumer outlets. Such a supplementary cooling means may air cool, water cool or include some other media adapted to cool the heat exchange fluid cycled through the surface condensers. When the heat exchange fluid is air cooled apparatus of the type described in U.S. Pat. application Ser. No. 119,472, Heavy Duty Air Cooled Condensation Equipment, invented by Heller et al., now abandoned may be used in conjunction with the supplementary cooling means.

Therefore, by providing a heating power plant with novel apparatus for circulating heat exchange fluids through one or more surface condensers and a supplementary cooling system adapted to cool the heating fluids, maximum electrical output may be obtained from the plant without corresponding concern for the heat output. The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic representation of a conventional heating power plant, duly labelled prior art;

FIG. 2 is a schematic representation of one type of supplementary cooling means adapted to water cool heating fluids cycled through a conventional heating power plant;

DESCRIPTION OF THE PREFERRED EMBODIMENTS

Figure 3:
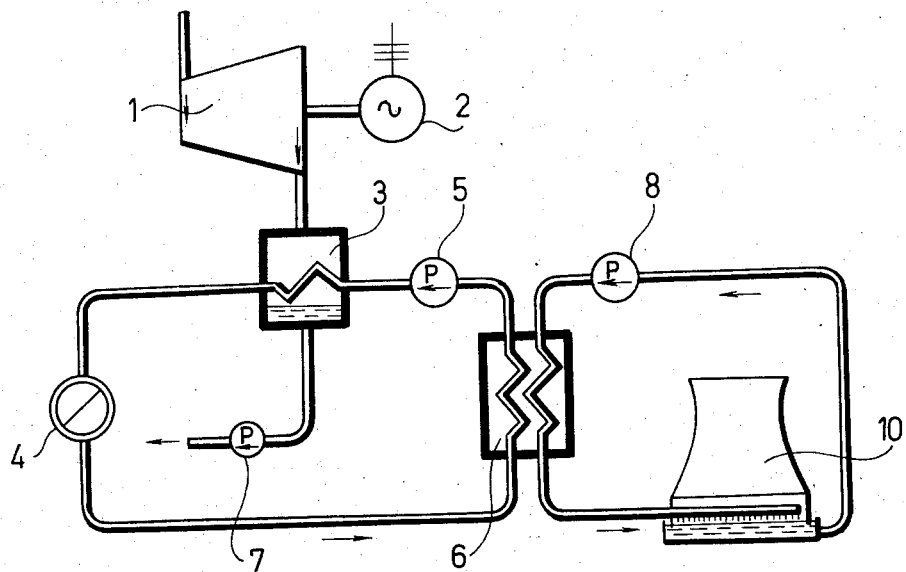
FIG. 3 is a schematic representation of a second type of supplementary cooling means adapted to water cool the heat exchange fluid circulating through a heating power plant.

Referring now to the Figures wherein like numbers denote the same parts, FIG. 1 schematically represents the design for a conventional heating power plant. Steam produced by turbine 1 as it drives electric power generator 2 is released through conduit means into condenser 3. Recycle pump 5 forces water through condenser 3 to condense the steam emitted from turbine 1. The warm recycle water is thereafter pumped under the pressure of pump 5 to heat consumers 4 where it is cooled. Such conventional heating power plants of the type labelled prior art only supply an amount of electric power corresponding to the demand for heat. However, in many instances there is a demand for peak electric capacity, for instance in summer, without concomitant demand for heat output.

Referring to FIGS. 2 and 3, when the supplementary cooling means are adapted to water cool the heat exchange fluid cycling through the closed recirculation conduit means, water to water heat exchanger 6 is connected in the return piping of the recirculation conduit means. When heat consumption through heat consumers 4 is insufficient to cool the heat exchange fluid for further steam condensation as it passes through surface condenser 3 the heat exchange fluid may be further cooled by conducting it through heat exchanger 6. The cool feed water to heat exchange 6 may be drawn from a natural source, for instance a river, as shown in FIG. 2 by any conventional method. If a natural water supply is unavailable the cool feed water may be recycled through a closed system in which wet cooling tower 10 is connected, as shown in FIG. 3. Cool recycle feed water is continuously driven through heat exchanger 6 and wet cooling tower 10 by pump 8 mounted in the closed feed water recirculation system. Any conventional wet cooling tower may be used in connection with the feed water recirculation system.

Figure 4:
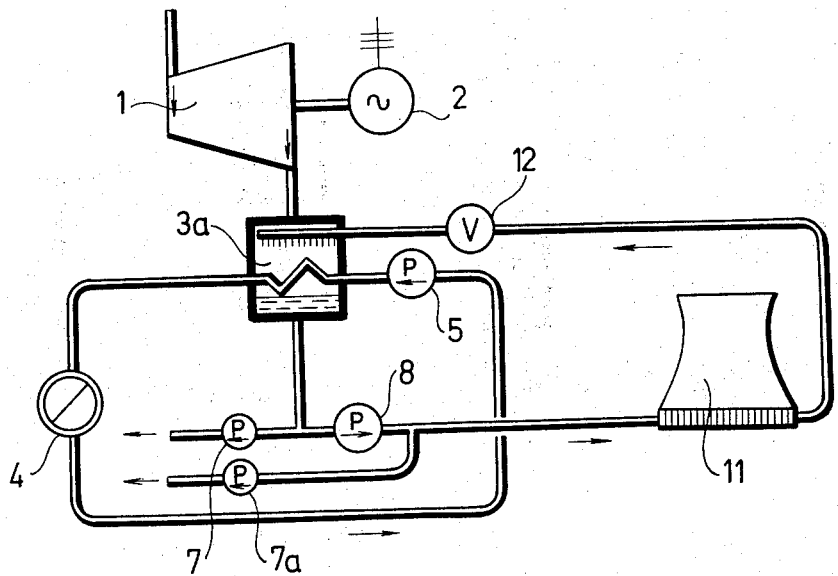
FIG. 4 is a schematic representation of another type of supplementary cooling system adapted to air cool the heat exchange fluids of the heating power plant.

If, as shown in FIG. 4, the water supply from natural or artificial sources is insufficient to water cool the heat exchange fluid, a jet condenser connected to an air condenser system of the type described in U.S. Pat. application Ser. No. 119,472 may be mounted in surface condenser 3a to jet spray cool feed water into the steam space of surface condenser 3a in sufficient quantities to condense the steam emitted from turbine 1 under full load. The effluent feed and condensate may be recycled under the pressure of pump 8 through dry cooling tower 11 for cooling and re-use. When pumps 7 and 7a are in an OFF position the feed water and effluent recirculate through a closed system.

Figure 5:
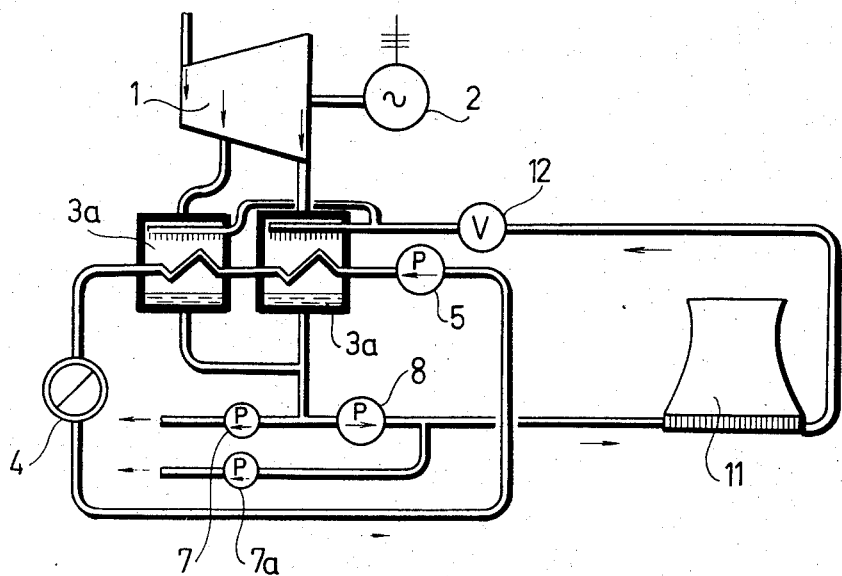
FIGS. 5, 6 and 7 are schematic representations of supplementary cooling means for air cooling more than one surface condenser in a heating power plant.
Figure 6:
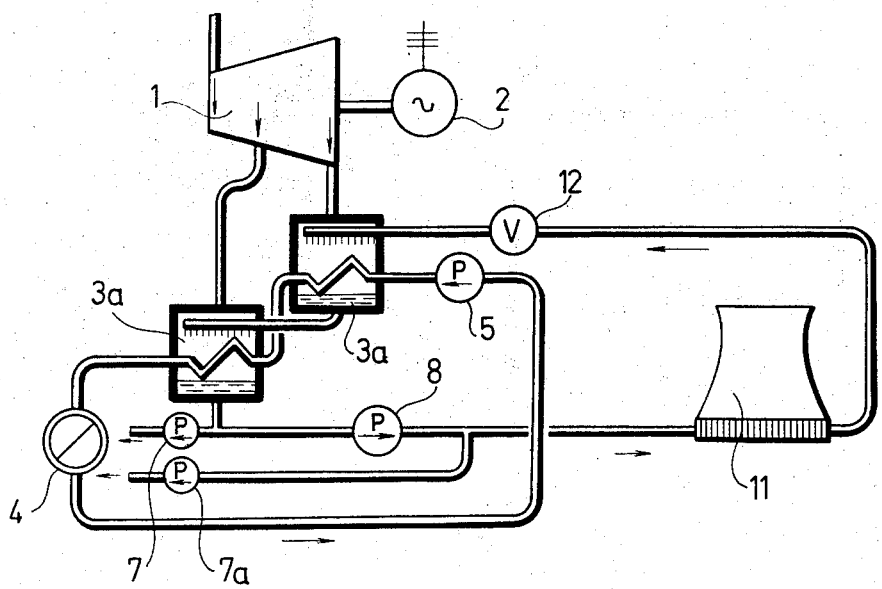
Figure 7:
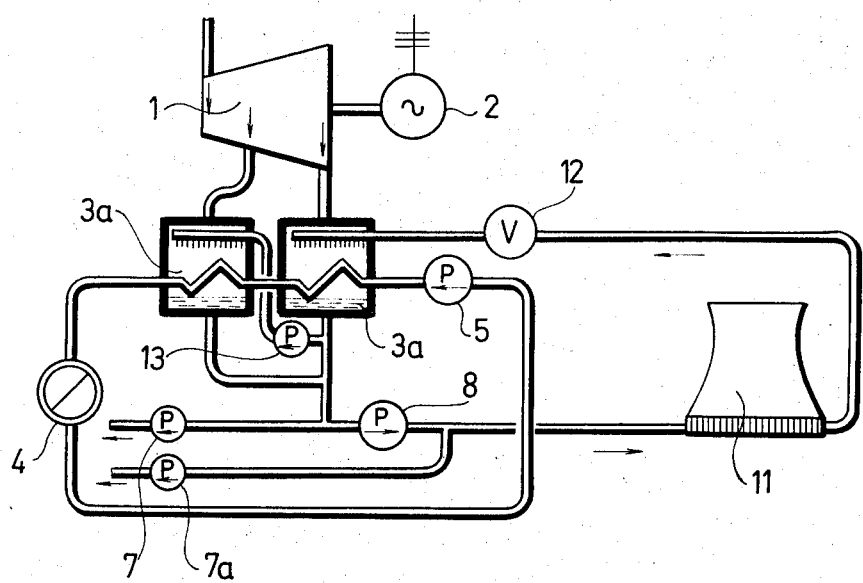

When more than one surface condenser 3a is linked to turbine 1 and the heat exchange fluid is cooled by jet spray, the feed water supplementary cooling means may assume different forms as shown in FIGS. 5, 6 and 7, depending in part on the positions of the condensers in relation to each other.

Referring to FIG. 5, cool feed water to be injected into the surface condensers may be conducted separately to the steam space of each surface condenser 3a. Valve 12 regulates the flow of cool feed water to the jet condensers. As shown, the cool feed water enters the side of the jet condensers, since surface condensers 3a are arranged in parallel connection.

Alternatively, as shown in FIG. 6, surface condensers 3a may be arranged in series but positioned one above the other such that the surface condenser 3a proximate turbine 1 is of lower pressure than the surface condenser 3a distal from turbine 1. Cool feed water may be injected into the surface condenser 3a proximate turbine 1 and the effluent feed and condensate may thereafter be conducted under the force of gravity to the surface condenser 3a distal from turbine 1 for use as a condensing jet spray therein, the latter surface condenser 3a being of higher pressure than former and being sited at an accordingly lower level relative to turbine 1.

When surface condensers 3a cannot be positioned at sufficiently different levels to achieve a satisfactory pressure differential with respect thereto the feed effluent and condensate accumulated in one surface condenser 3a may be transferred by transfer pump 13 into a second surface condenser 3a and used as a cool feed therein to condense steam emitted into that second surface condenser 3a.

Referring particularly to FIGS. 4 and 7, steam emitted from steam turbine 1 is conducted to surface condenser 3a which is fitted with injection nozzles. Feed water cooled in the supplementary cooling system is sprayed within the interior of surface condenser 3a, the temperature and quantity of feed water being sufficient to condense the steam issuing from turbine 1 under full load. Heat exchange fluid which is warmed in surface condenser 3a passes to heat consumers 4 where it is cooled prior to recycle under the pressure of recirculating pump 5 and again to surface condenser 3a.

In winter, when the supplementary cooling system is not in use upper return water pump 7 drives the condensate accumulated at the bottom of surface condenser 3a into an effluent trap or supply tank for reuse. When the supplementary cooling system is in operation, as in summer, the effluent feed and condensate accumulated at the bottom of surface condenser 3a are drawn off for recycle by circulating pump 8. As this occurs lower return water pump 7a operates to draw off an amount of water substantially corresponding to the quantity of condensate added to the effluent feed which is to be recirculated. The water drawn off by pump 7a may be delivered to a supply tank for later use as feed water that may be added to the system to replace any water loss. The effluent feed passes through conduit means to dry cooling tower 11 where it is cooled before recycle to the injection nozzles of the surface condensers through choke valve 12. Thus, surface condensers 3a simultaneously perform as condensation surfaces and jet condensers to ensure that the steam emitted from turbine 1 is condensed even during full loading of the power plant.

The advantages gained by use of this invention, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In combination, a steam turbine, at least one surface condenser arranged to receive steam from said steam turbine, recirculation conduit means for continuously recycling a heat exchange fluid through said at least one surface condenser, said recirculation conduit means being arranged so as to permit said heat exchange fluid to exchange heat with said steam, pump means for unidirectionally circulating said heat exchange fluid through said recirculation conduit means so as to permit a recycle of said heat exchange fluid through said at least one surface condenser, said pump means being mounted in said recirculation conduit means, and supplementary cooling means for cooling said recycled heat exchange fluid prior to re-entrance through said at least one surface condenser including a liquid-to-liquid heat exchanger connected in the return piping of said recirculation conduit means, second conduit means for continously recycling a cool feed liquid through said liquid-to-liquid heat exchanger to cool said heat exchange fluid, said second conduit means being discrete in relationship to said recirculation conduit means, a source of cool liquid for circulation through said second conduit means and said liquid-to-liquid heat exchanger, said second conduit means connecting said supply of cool liquid and said liquid-to-liquid heat exchanger, one to the other, and pump means for unidirectionally circulating said cool liquid through said second conduit means so as to permit a recycle of said cool liquid through said liquid-to-liquid heat exchanger and said supply thereof, said pump means being mounted in said second conduit means.

2. The combination of claim 1 wherein said supplementary cooling means comprises a cooling tower adapted to cool a feed fluid, a jet condenser having a plurality of spray nozzles, said jet condenser being mounted in the steam space of said at least one surface condenser and being arranged in said steam space to release a measured spray of cool feed fluid into said steam space to condense steam received therein from said turbine, second conduit means for continuously recycling said cool feed fluid from said at least one surface condenser through said cooling tower to said jet condenser, said second conduit means being arranged to connect, in series, said at least one surface condenser, said cooling tower and said jet condenser, and pump means for unidirectionally circulating said cool feed fluid through said second conduit means so as to permit a recycle of said cool feed fluid through said jet condenser, said pump means being mounted in said second conduit means.

3. The combination of claim 2 including valve means for controlling the flow of cool feed fluid into said jet condenser, said valve means being mounted in said second conduit means proximate said jet condenser.

4. The combination of claim 2 wherein said at least one surface condenser comprises first and second surface condensers connected in parallel relationship relative to said steam turbine and serially connected in said recirculation conduit means, said first surface condenser being disposed below said second surface condenser, said second surface condenser being of lower pressure relative to said first surface condenser, and wherein said supplementary cooling means further include a second jet condenser having a plurality of spray nozzles, said second jet condenser being mounted in the steam space of said first surface condenser and being connected to the underside of said second surface condenser for receiving therein an admixture of cool liquid and condensate collected in said second surface condenser and re-releasing said admixture into said first surface condenser to condense steam received in said first surface condenser from said turbine.

* * * * *